(12) United States Patent
Suzuki et al.

(10) Patent No.: US 6,253,729 B1
(45) Date of Patent: Jul. 3, 2001

(54) INDUCTION CONTROL FOR DIRECT INJECTED ENGINE

(75) Inventors: Yuichi Suzuki; Katsumi Ochiai; Uichitake Uchiyama, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/067,213

(22) Filed: Apr. 28, 1998

(30) Foreign Application Priority Data

Apr. 30, 1997 (JP) .................................................... 9-128088

(51) Int. Cl.[7] ......................................................... F02B 3/00
(52) U.S. Cl. ............................. 123/302; 123/301; 123/295
(58) Field of Search .................................... 123/302, 301, 123/295, 305, 260, 257

(56) References Cited

U.S. PATENT DOCUMENTS

| 3,924,598 | * | 12/1975 | Davis | 123/301 |
|---|---|---|---|---|
| 4,300,494 | * | 11/1981 | Graiff et al. | 123/193.5 |
| 4,957,081 | * | 9/1990 | Ito et al. | 123/302 |
| 5,125,380 | * | 6/1992 | Nakae et al. | 123/257 |
| 5,259,348 | * | 11/1993 | Kobayashi et al. | 123/302 |
| 5,327,864 | * | 7/1994 | Reguero | 123/260 |
| 5,343,839 | * | 9/1994 | Baika et al. | 123/257 |

FOREIGN PATENT DOCUMENTS

| 1495476 | * | 7/1989 | (SU) | 123/193.5 |
|---|---|---|---|---|
| 1523945 | * | 11/1989 | (SU) | 123/193.5 |

* cited by examiner

Primary Examiner—John Kwon
(74) Attorney, Agent, or Firm—Ernest A. Beutler

(57) ABSTRACT

A direct injected, internal combustion engine combustion chamber configuration that employs a shrouded arrangement for the intake valve seat so as to generate a tumble motion under at least some running conditions. This is accomplished by a shrouding of the intake valve in such a way that the flow direction effects a tumbling motion and also so that the air flow does not adversely affect the flow from the injector nozzle.

21 Claims, 6 Drawing Sheets

INDUCTION CONTROL FOR DIRECT INJECTED ENGINE

BACKGROUND OF THE INVENTION

This invention relates to an internal combustion engine and more particularly to an improved induction control system for a direct injected engine.

The continued demand for higher performance and more efficient and lower emission internal combustion engines has prompted the widespread use of fuel injection as a method of charge forming. By utilizing fuel injectors, a number of benefits can be gained. Among these include the ability to more accurately control the amount of fuel delivered, particularly on a cycle-by-cycle basis.

Most production engines that employ fuel injection, however, employ a system which is referred to as "manifold injection." With this type of arrangement, the fuel is injected into the intake passage generally in proximity to the intake port that serves the combustion chamber. This system permits the use of lower cost fuel injectors and still obtains many of the benefits of fuel injection.

However, it is generally necessary to have a homogeneous fuel air mixture in the combustion chamber. This is done to insure combustion at the appropriate timing. This is particularly true in conjunction with spark ignited engines. As a result of this, there is actually more fuel in the combustion chamber than is necessary to obtain the desired power under most running conditions. Thus, there gives rise to the problem of higher than necessary fuel consumption and also greater than desired exhaust gas emissions.

Therefore, there has been a desire to obtain an engine that can run in a so-called "lean burn" mode. This involves fling the cylinder with a less than stoichiometric mixture under all but high speed, high load running conditions. If this can be achieved, then further improvements in fuel economy and exhaust emission control can be obtained.

One way of obtaining the capability of lean burning is if the charge in the combustion chamber is stratified. Although stratification can be easily obtained utilizing pre-combustion chambers, these chambers give rise to pumping losses and have other disadvantages. Therefore, there is a desire to be able to obtain stratification in an open chamber engine. Direct cylinder fuel injection lends itself to achieving this goal.

However, there is still a difficulty in insuring that the appropriate fuel air mixture is present at the spark plug at the time of firing. Also, there is a desire to increase the turbulence in the charge at low speeds and low loads so as to insure good flame propagation.

It is, therefore, a principal object of this invention to provide an improved internal combustion engine having direct cylinder injection and wherein lean burning through stratification can be accomplished.

It is a further object of this invention to provide an improved arrangement for introducing a fuel air charge into the combustion chamber of an engine that will ensure good burning under all running conditions.

In connection with the generation of turbulence in the combustion chamber, this is desirable in order to obtain good flame propagation under low speed low load conditions. Most turbulence generating devices, however, restrict the amount of airflow and hence, the power output of the engine will be reduced.

It is a further object of this invention to provide an improved turbulence generating arrangement for the induction system of an engine wherein high speed high load output are not sacrificed.

In addition to desiring turbulence in the combustion chamber, another problem that is attendant with direct fuel injection is the difficulty of confining the location of the injected fuel. Obviously, the fuel must be injected at a fairly high pressure so as to insure that adequate will be present to serve all running conditions. This high pressure spray, however, is somewhat difficult to control.

It is, therefore, a still further object of this invention to provide an improved induction passage arrangement for a direct injected engine wherein the induction passage assists in controlling the direction of fuel spray and increasing turbulence without significantly reducing the amount of fuel spray.

SUMMARY OF THE INVENTION

This invention is adapted to be embodied an internal combustion engine that has a cylinder block, cylinder head assembly which define a cylinder bore that is closed at one end by a surface of the cylinder head portion of the cylinder block, cylinder head assembly. A piston reciprocates in the cylinder bore and forms a combustion chamber with the cylinder bore and cylinder head surface. At least one intake passage extends from an inlet opening in an outer surface of the cylinder block, cylinder head assembly and serves the combustion chamber through an intake valve scat formed in the cylinder head surface. A poppet type intake valve is supported in the cylinder head portion of the cylinder block, cylinder head assembly for controlling the opening and closing of the intake valve seat. The intake passage has a general configuration that causes the flow into the combustion chamber to be in a direction generally toward a plane containing the axis of the cylinder bore and downwardly toward the head of the piston. A fuel injector is mounted in the cylinder block cylinder head assembly with a discharge port directed into the combustion chamber so as to spray in a direction generally parallel to the axis of the airflow charge through the intake passage. The fuel injector discharge port is disposed in proximity to a peripheral edge of the intake valve seat. The intake valve seat is formed within the cylinder head surface and is bounded by a masking peripheral edge of the cylinder head surface which partially shrouds the discharge flow of air past the intake valve through the intake port toward the fuel injector on the side closest to the cylinder bore.

DETAILED DESCRIPTION OF THE PREFERRED EMBODIMENT

Figure 1:
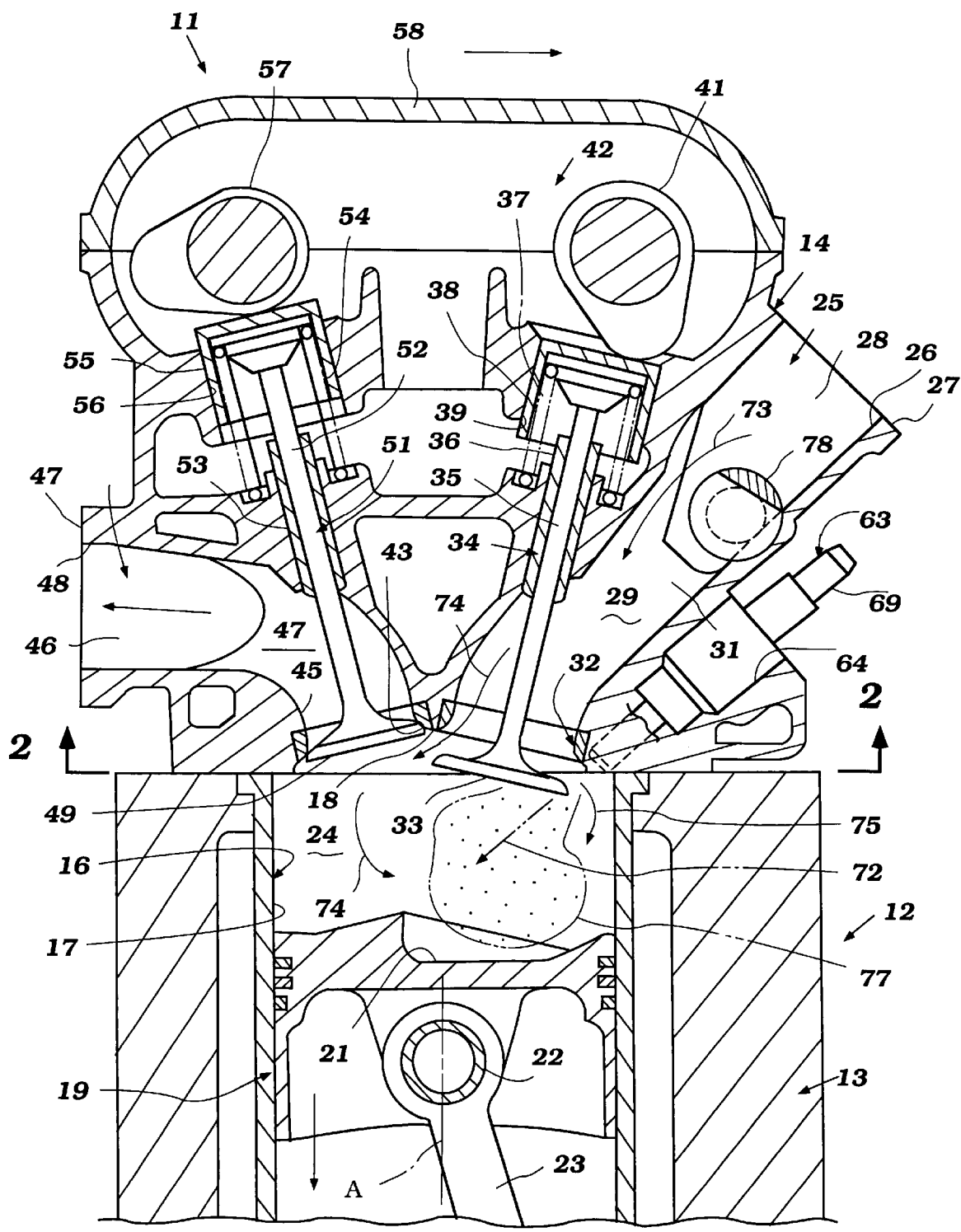
FIG. 1 is a partial cross-sectional view taken through a portion of a single cylinder of an internal combustion engine constructed in accordance with a first embodiment of the invention and showing only the upper portion of the engine.
Figure 2:
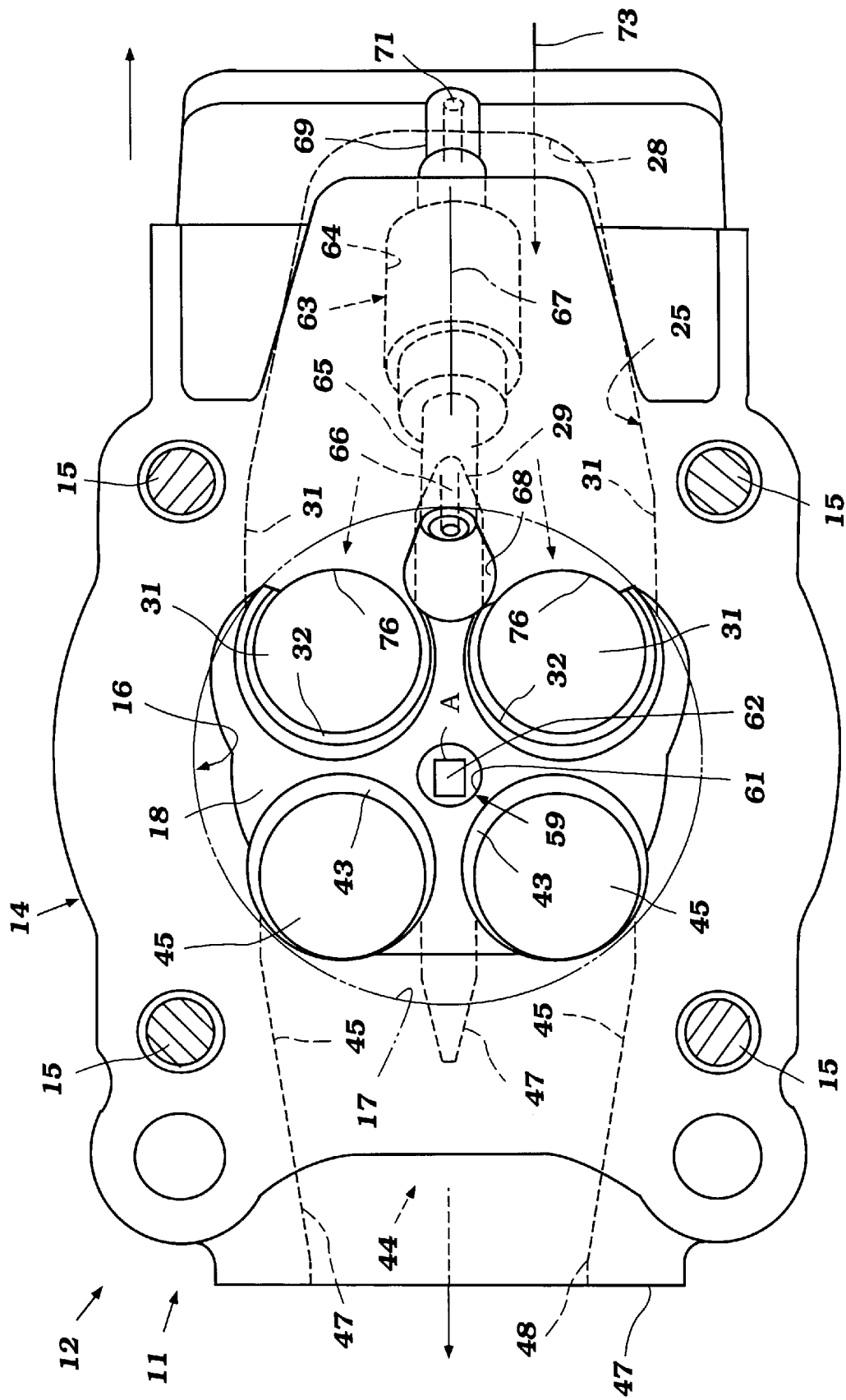
FIG. 2 is a bottom plan view showing the underside of the cylinder head assembly, with the valves removed and is taken generally in the direction of the line 2—2 in FIG. 1.
Figure 3:
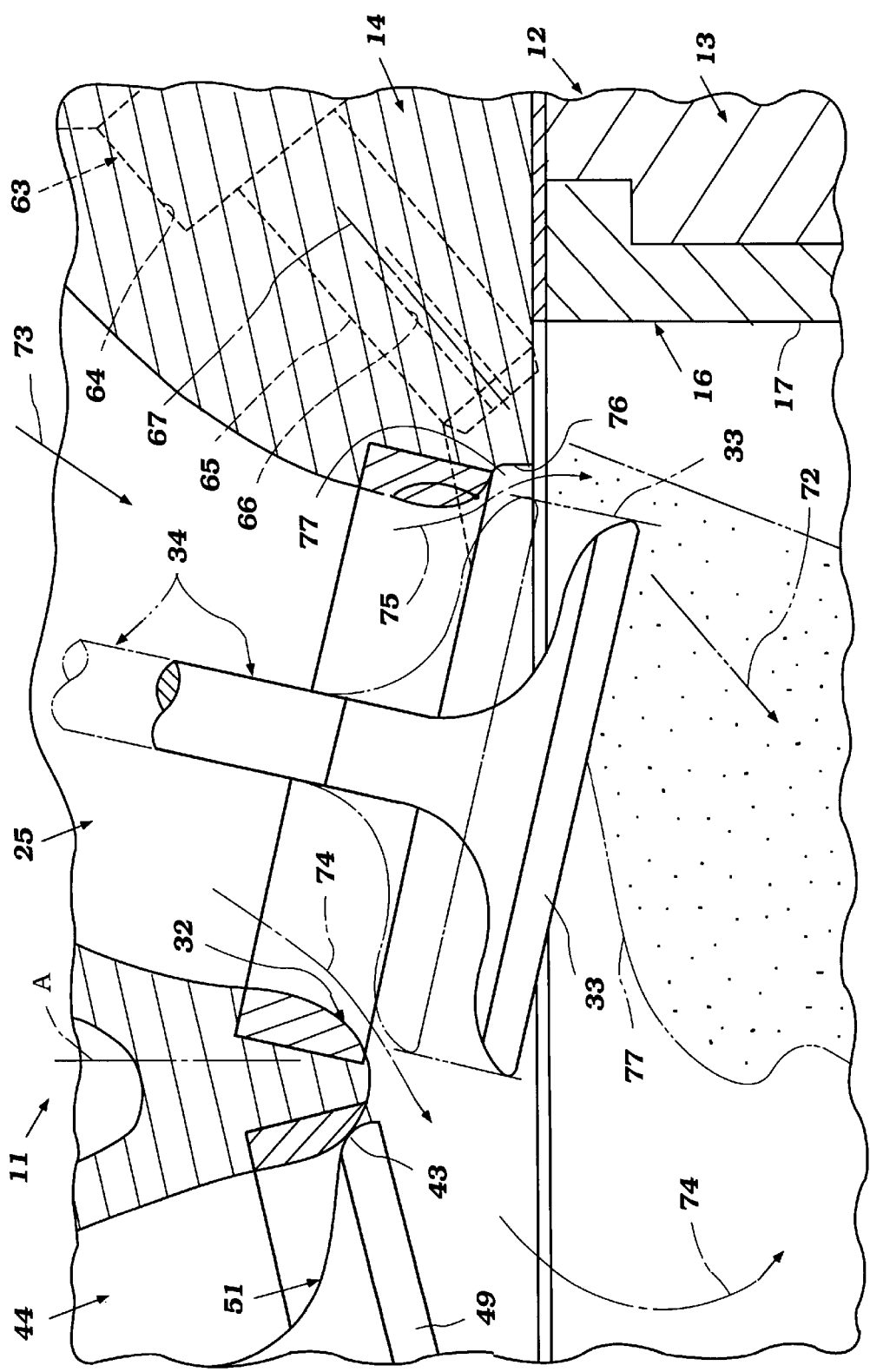
FIG. 3 is an enlarged cross-sectional view taken along the same plane as FIG. 1 but primarily showing the construction associated with one of the intake valves and its seat to show the masking effect.

Referring now in detail to the drawings and initially to FIGS. 1–3, a portion of an internal combustion engine constructed and operated in accordance with an embodiment of the invention is identified generally by the reference numeral 11. The engine 11 includes a cylinder block, cylinder head assembly, indicated generally by the reference numeral 12. This is comprised of a cylinder block 13 and a cylinder head assembly 14 that is detachably connected to the cylinder block 13 by means of threaded fasteners 15 (FIG. 2).

Since the invention deals primarily with the induction system for the engine 11 and the charge forming system 40, the lower part of the engine is not shown. Where any engine component is not illustrated or described, it may be assumed that any conventional construction may be utilized for such components.

In the illustrated embodiment, the cylinder block 13 is provided with a cylinder liner 16 that is cast, pressed, or otherwise positioned within the main body of the cylinder block 13. This permits the use of a light alloy material such as aluminum or aluminum alloy for the main cylinder block 13 with the cylinder bore, indicated at 17, to be formed from a harder more wear resistant material.

The cylinder bore 17 has an axis indicated at A and is closed at its upper end by the cylinder head 14. The cylinder head 14 is formed with a lower surface 18 that closes the cylinder bore at this end. It should be noted that, although the invention is described in conjunction with an engine having a detachable cylinder head and wherein the cylinder bore is formed by a liner in the cylinder block, it may be utilized with other types of arrangements, for example, those having integral cylinder heads and cylinder blocks.

A piston 19 is supported for reciprocation within the cylinder bore 17 along its axis A. The head of the piston 19 is formed with a bowl 21 which assists in the stratification process of the fuel, as will become apparent.

A piston pin 22 connects the piston 19 to the upper or small end of a connecting rod 23. The lower end of the connecting rod 23, (which does not appear in the drawings) is rotatably journaled in a known manner on a crankshaft which is not illustrated, for the reasons already noted.

The area in the cylinder bore 17 above the head of the piston 19, the head of the piston 19 and the cylinder head recessed surface 18 form a combustion chamber, indicated generally by the reference numeral 24. An intake charge is delivered to this combustion chamber 24 by an intake passage arrangement, indicated generally by the reference numeral 25.

The intake passage arrangement 25 is comprised of an inlet opening 26 that is formed in an outer surface 27 of the cylinder head 14. A suitable induction system which is not shown but may include an air inlet device, a flow controlling throttle valve and silencing and filtering arrangements provides an atmospheric air source to the inlet opening 26 of the inlet passage arrangement 25.

The inlet opening 26 serves a common runner portion 28 that extends generally downwardly and inwardly toward a plane containing the axis of the cylinder bore axis A. This common passage 28 is divided by a dividing wall 29 into a pair of passage portions 31 each of which terminates at a respective intake valve seat 32.

The heads 33 of a respective poppet-type intake valves 34 cooperates with the valve seats 32 for controlling the flow through the intake passage arrangement 25 into the combustion chamber 24. Each intake valve 34 has a stem portion 35 that is slidably supported within a guide 36 provided in the cylinder head 14.

A coil compression spring 37 cooperates with a keeper retainer assembly for urging the intake valves 34 to their closed positions. Bucket-type tappets 38 are supported within bores 39 formed in the cylinder head 14. These bucket-type tappets 38 are operated by the lobes of an intake camshaft 41. The intake camshaft 41 is rotatably journaled within a cam chamber 42 formed at the upper end of the cylinder head assembly 14. A suitable timing drive drives the camshaft 41 at one-half crankshaft speed, as is well known in the art.

As may be best seen from FIG. 2, the intake valve seats 32 lie substantially on one side of a plane that contains the axis of the cylinder bore 17. On the opposite side of this plane, there are provided a pair of exhaust valve seats 43. These exhaust valve seats 43 are formed at the inlet end of an exhaust passage arrangement 44. The exhaust passage arrangement 44 includes a pair of branch sections 45 that extend from the exhaust valve seats 43 upwardly and then turn where they merge into a common section 46.

A wall 47 divides the inlet portions 45 downstream of the common portion 46. The common portion 46 opens through an outer face 47 of the cylinder head 14 through an exhaust discharge opening 48. A suitable exhaust system (not shown) may be affixed to the cylinder head surface 47 so as to collect the exhaust gases and discharge them to the atmosphere.

The heads 49 of poppet type exhaust valves 51 control the flow through the exhaust valve scats 43. The poppet type exhaust valves 51 have stem portions 52 that are slidably supported in guides 53 fixed in the cylinder head 14. Coil compression springs 54 act against keeper retainer assemblies fixed to the ends of the valve stems 52 for holding the exhaust valve 51 in their closed positions.

Bucket-type tappets 55 are slidably supported in bores 56 formed in the cylinder head 14. The lobes of an exhaust camshaft 57 cooperate with the bucket tappets 55 for opening the exhaust valves 51 in a known manner.

Like the intake camshaft 41, the exhaust camshaft 57 is driven by a suitable timing drive at one-half crankshaft speed. This exhaust camshaft 57 is also contained within the cam chamber 42. This cam chamber 42 is closed by a cam cover 58 that is fixed to the cylinder head 14 in a known manner.

As seen only in FIG. 2, a spark plug, indicated generally by the reference numeral 59 is mounted in a tapped hole 61 in the cylinder head 14. This spark plug 59 has its terminal 62 disposed substantially on the axis A of the cylinder bore 17. Thus, good flame propagation will be insured.

A fuel injector, indicated generally by the reference numeral 63 is mounted on the intake side of the cylinder head 14 in an injector receiving recess 64 formed beneath the intake passage arrangement 21. As may be best seen in FIG. 13, the fuel injector 63 has a nozzle portion 65 that defines a spray opening 66 that has a spray axis 67. This spray axis 67 extends generally parallel to the flow direction through the main portion of the intake passage arrangement 25 and is slightly offset from it.

As may be best seen in FIG. 2, the cylinder head surface 18 is provided with a recessed opening 68 through which the tip portion of the injector nozzle 65 extends so as to not obstruct the flow from the injector 63. The exposed portion of the injector 63 has a fuel delivery tip 69 that cooperates with a fuel rail (not shown) so as to deliver fuel to the injector body through a fuel inlet 71.

The injector 63 may be of any known type and generally has a solenoid winding that operates an injector valve so as to open and close the nozzle port 66 so that fuel will be sprayed into the combustion chamber in a direction indicated generally by the arrow 72 as seen in FIGS. 1 and 3. The fuel supply system for supplying fuel to the injector 63 may be of any known type and thus, has not been illustrated. Also the injection timing strategy will be described in more detail later by reference to FIG. 5.

As has been noted, if stratification is to be obtained, it is important to ensure that the patch of fuel that is at a stoichiometric ratio will be in the vicinity of the gap 62 of the spark plug 59 at the time of firing. This is particularly important when operating with a very lean overall mixture under low speed/low load and lower mid-range conditions. However, it is also important to ensure that there is turbulence in the combustion chamber so that once the flame is initiated, it will rapidly propagate across the flame front.

The direction of airflow is also important in addition to obtaining the turbulence in ensuring that the fuel patch is at the appropriate location. In accordance with an important feature of the invention, the intake passage arrangement and particularly the area around the intake valve seats 32 is configured so as to achieve this result.

As may be best seen in FIGS. 1 and 3, the intake air flowing through the intake passage arrangement 25 follows in a direction indicated by the arrow 73 through the common portion 29 and then branches toward the individual sections 29 and their valve seats 32. When the intake valve 34 opens, the flow passes around the intake valve head 33 with a first portion, indicated by the arrow 74 flowing generally downwardly toward the cylinder bore axis A and the plane that contains it. This will tend to cause a tumble motion in the combustion chamber indicated again by the reference numeral 74. That is, the flow goes downwardly toward the head of the piston 19 where it is then deflected across the cylinder bore and back across the plane containing the axis of the cylinder bore A and then in an upward direction.

There is, however, another flow path around the other side of the head portion indicated by the arrow 75 which also causes a tumble motion but in an opposite direction. Hence, rather than generating turbulence, these opposing tumble motions will tend to cancel each other out and reduce the tumble effect. This is not desirable.

Therefore, in accordance with the invention and as is best seen in FIG. 3, there is provided a shrouded area 76 that extends around the intake valve seat 32 on the side thereof away from the cylinder bore axis A and adjacent the cylinder bore 17. This provides a somewhat restricted flow path 77 through which the air is channeled when the intake valve 34 is in its initial opening phase as seen in the phantom line in FIG. 3. The path followed by the valve heads 33 is shown by the phantom lines in this figure.

The result of this is that when the intake valves 34 initially begin their lift, there will be a flow restriction caused by the shrouding area 76 on the sides adjacent both the cylinder bore and the fuel injector 63 and hence there will be a greater flow path in the direction of the arrow 74 than in the direction of the arrow 75. Also, since more air is channeled in this direction, the flow velocity will be higher. Hence, the tumbling motion in the direction of the arrow 74 will be much greater than that of the direction of the arrow 75.

Figure 6:
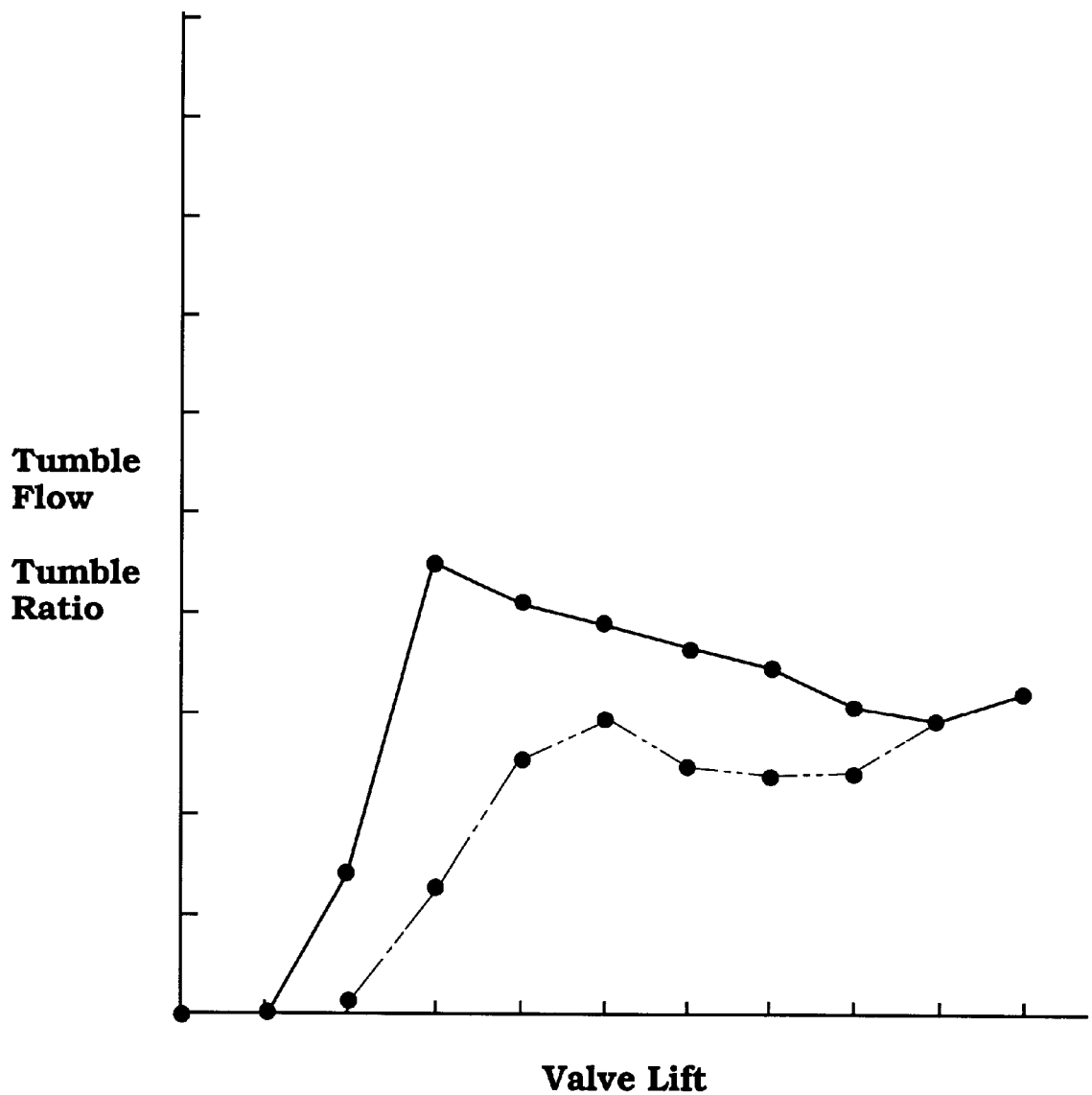
FIG. 6 is a graphical view showing the tumble ratio in relation to valve lift in connection with the embodiment of the invention illustrated in solid lines and in the prior art or conventional type structure in the phantom lines.

This may be seen best in FIG. 6 wherein there is depicted the tumble ratio in relation to valve lift of the instant invention as shown in solid lines and the prior art type without shrouding as shown in phantom line curve. It will be seen that the tumble ratio actually increases rather abruptly even at low lifts and then stays at a higher rate until the valve is fully opened. At this time, the shrouding effect will be minimized and also the flow resistance will be reduced so that the system then tapers off and operates more like a conventional system.

This has the effect of providing increased tumble flow and assists in confining the fuel patch, indicated by the shaded area 77 in FIGS. 1 and 3 in the area adjacent the piston bowl 21 and on the one side of the combustion chamber.

This tumble action can be further augmented by providing a tumble control valve, indicated generally by the reference numeral 78 in the intake passage portion 28. FIG. 1 shows this tumble valve in its closed position wherein it is maintained under low speed/low load conditions. This causes the direction of the flow to be more toward the enshrouded side of the valve seat 32 and further augments the tumble action already described.

As the load and speed of the engine increases, the tumble valve 78 is opened and this tumbling motion is somewhat diminished. In addition, the flow restriction is also substantially diminished. Thus, this relationship ensures that the desired flow motion will be obtained in the combustion chamber so as to aid in stratification.

In addition, the shrouding provided by the shroud area 76 will reduce the effect of the air flow from redirecting or dispersing the fuel injection if it is injected early in the cycle. In fact, in accordance with another feature of the invention, the injection strategy is chosen so as to further maximize the stratification and prevent dissipation.

Figure 4:
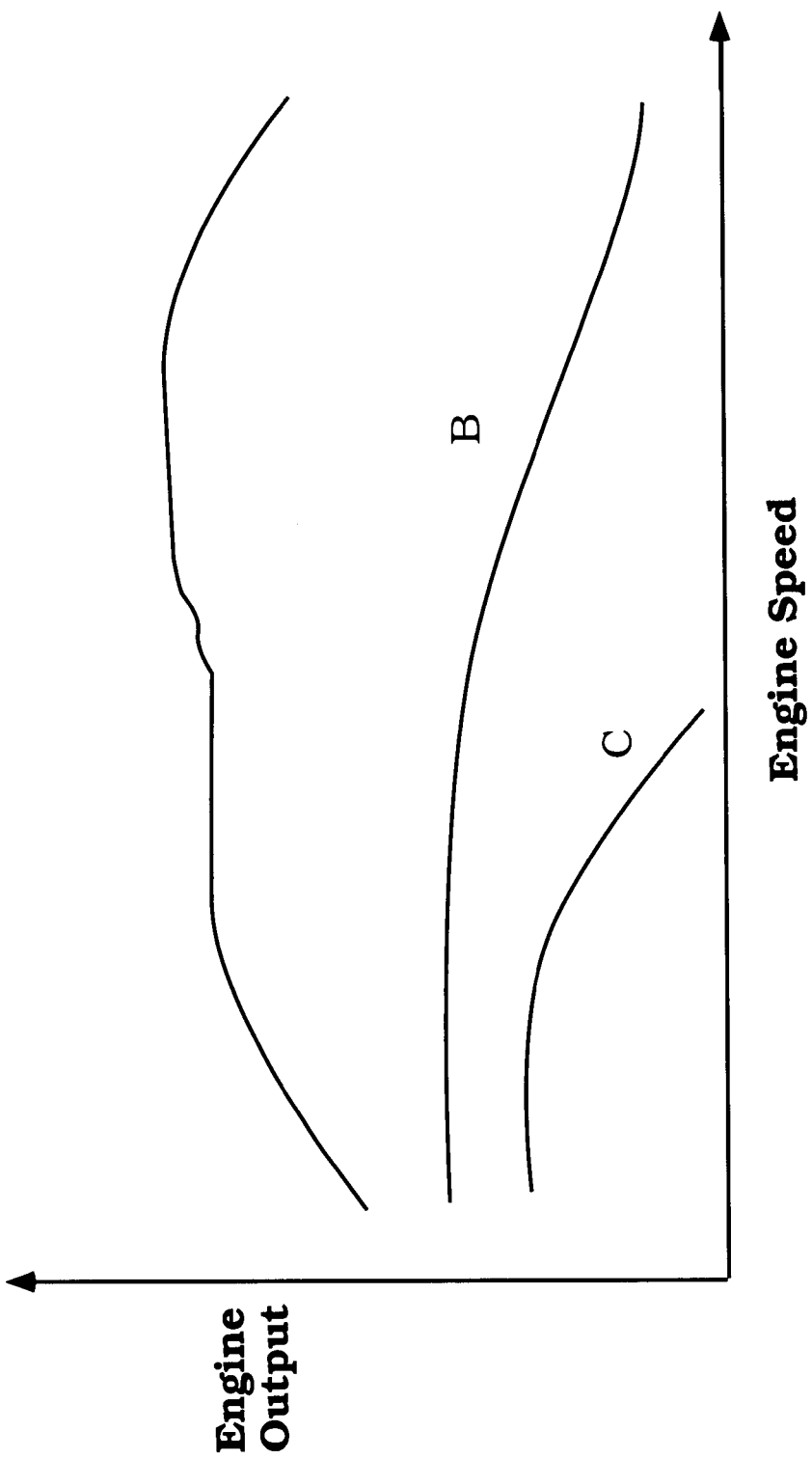
FIG. 4 is a graphical view that depicts the power output of the engine under certain different running control conditions.
Figure 5:
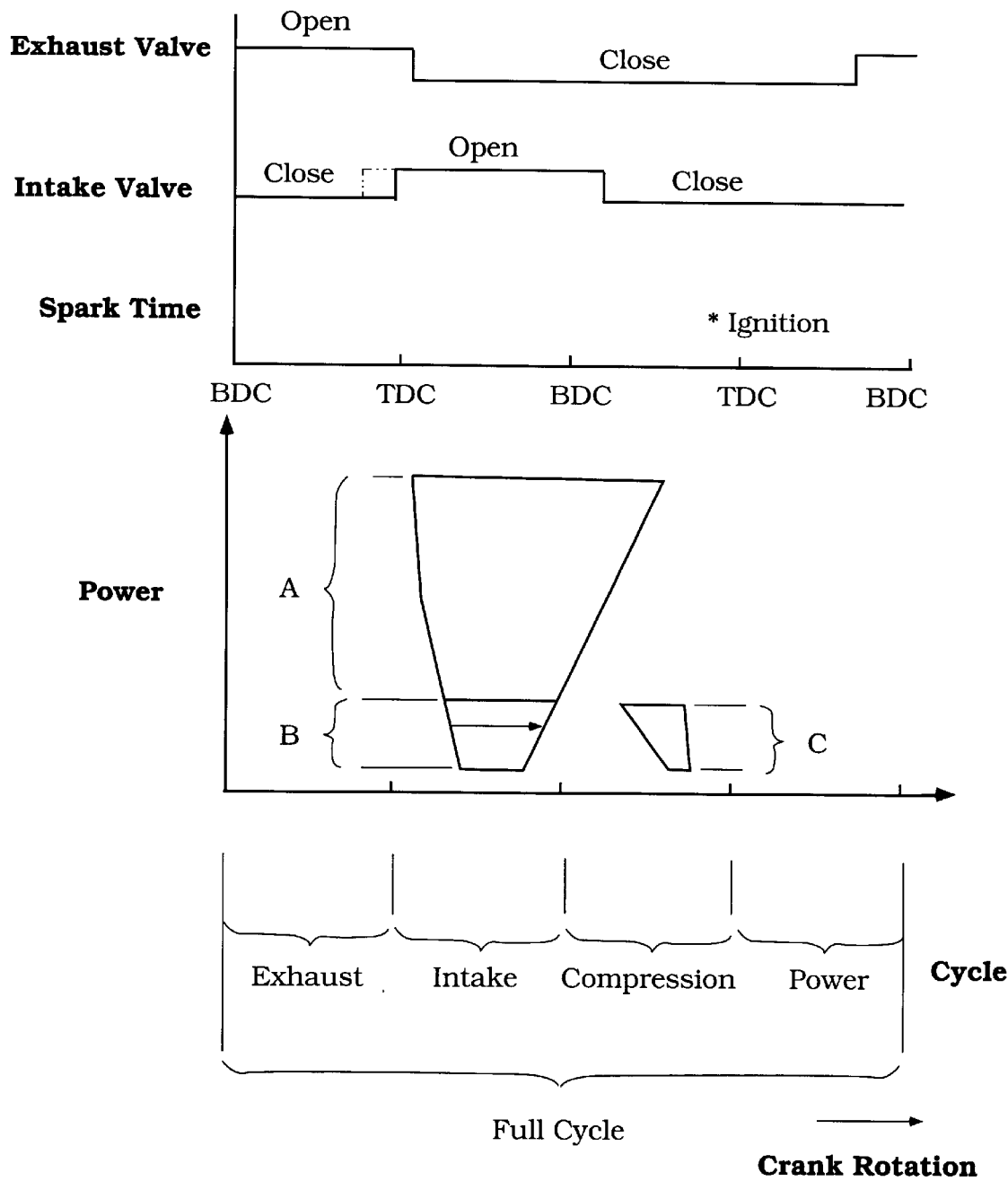
FIG. 5 is a graphical view showing from top to bottom the timing of the opening of the exhaust valve, the intake valve and the firing of the spark plug, and in the lower portion the varying conditions of the fuel injection under the varying types of engine control conditions.

FIGS. 4 and 5 explain this situation. In accordance with the invention, the fuel injection timing is controlled so under low speed/low load conditions injection begins toward the end of the compression stroke. This means that the fuel is injected actually after the intake valve is closed as may be seen in FIG. 5 by the control range "C" under lower load conditions. This provides a lesser total engine power output as seen in FIG. 4 in relation to speed but improves significantly the fuel stratification and thus the fuel economy.

Since the fuel is injected after the intake flow has stopped, the intake air will not disperse the fuel spray and the fuel patch 77 can be maintained. Because of the tumbling action which has been generated, this patch will then be moved into proximity with the gap 62 of the spark plug at the time of firing and thus even though only a small amount of fuel may be injected, combustion will be assured because there will be definitely a stoichiometric mixture at the spark gap at the time of firing. The piston bowl 21 will also assist in confining the fuel patch.

As the power requirements increase, the beginning of injection is advanced while the ending is maintained relatively constant as also seen in FIG. 5. Thus, added fuel will be introduced but very little fuel if any will be introduced at the time when the intake valve is opened.

As the speed and/or load on the engine increases, the control moves to the routine phase "B". During this phase, a greater amount of fuel is injected and the injection is advanced during the beginning of the intake stroke rather than at the end of the compression stroke. This means that some of the air charge will act on the fuel patch so as to redirect it but nevertheless the fuel patch will still be maintained and it will again pass the spark plug at the time of firing. However, under this condition, the fuel patch may actually have made a revolution in the combustion chamber having passed a spark plug one time and then coming into registry with it again, depending upon the weight of tumble. This provides a power output as shown at B in FIG. 4.

As the speed and load increase, the timing of the injection is both advanced and the ending is retarded so as to provide a longer injection cycle. This is done because now there will be a greater amount of fuel in the combustion chamber and a more homogeneous mixture is desired. However, the late injected fuel will ensure a stoichiometric mixture at the presence of the spark plug at the time of firing.

As also seen by the phantom line in FIG. 5 the intake valve timing may be adjusted during engine running. This can increase the ability to induct the air charge.

Thus, it should be apparent that the described intake passage arrangement, the shrouding and the use of the tumble valve and specific injection timing pattern all go together to provide an excellent stratification of the charge under conditions when it is desired, the proper decree of turbulence to ensure good flame propagation and unrestricted breathing capabilities to achieve high power output.

It will be readily apparent to those skilled in the art that the foregoing description is that of the preferred embodiment of the invention. Various changes and modifications may be made without departing from the spirit and scope of the invention, as defined by the appended claims.

What is claimed is:

1. An internal combustion engine having a cylinder block, cylinder head assembly defining a cylinder bore closed at one end by a surface of the cylinder head portion of said cylinder block, cylinder head assembly, a piston reciprocating in said cylinder bore and forming a combustion chamber with said cylinder bore and said cylinder head surface, at least one intake passage extending from an inlet opening in an outer surface of said cylinder block, cylinder head assembly and serves the combustion chamber through an intake valve seat formed in said cylinder head surface, a poppet type intake valve supported in cylinder head portion for controlling the opening and closing of said intake valve seat, said intake passage having a general configuration that causes the flow into said combustion chamber to be in a direction generally toward a plane containing the axis of said cylinder bore and downwardly toward a head of said piston, and a fuel injector mounted in said cylinder head portion with a discharge port directed into the combustion chamber so as to spray in a direction generally parallel to the axis of the air flow charge through said intake passage, said fuel injector discharge port being disposed in proximity to a peripheral edge of said intake valve seat, said intake valve seat being formed within said cylinder head surface and being bounded by a masking peripheral edge of said cylinder head surface which extends from one side of said intake valve seat towards said piston head around a portion of said valve seat that is disposed adjacent said cylinder bore and said fuel injector discharge port and partially shrouds the discharge flow of air past said intake valve through the intake valve seat from flowing in a direction toward the side closest to said cylinder bore and for directing the air flow from said intake port in the area of said masking peripheral edge axially toward said piston head.

2. An internal combustion engine as set forth in claim 1, wherein there are two intake valves seats at the termination of the intake passage and both on the same side of the plane containing the cylinder bore axis and opening into the cylinder head surface and controlled by a respective intake valve.

3. An internal combustion engine as set forth in claim 2, wherein the intake valve seats are disposed in side-by-side relationship at spaced distances from the plane containing the cylinder bore axis and both are shrouded on their outer surfaces adjacent the cylinder bore.

4. An internal combustion engine as set forth in claim 3, wherein the fuel injector is disposed between the intake valve seats.

5. An internal combustion engine as set forth in claim 4, wherein the fuel injector extends generally parallel to and below the intake passages.

6. An internal combustion engine as set forth in claim 1, further including a spark plug having a spark gap disposed substantially on the cylinder bore axis.

7. An internal combustion engine as set forth in claim 6, further including an exhaust passage extending from an exhaust valve scat disposed in the cylinder head surface on the opposite side of the plane containing the cylinder bore axis from the intake valve seat and exiting the cylinder block, cylinder head assembly through an outlet opening formed in the cylinder head portion.

8. An internal combustion engine as set forth in claim 7, wherein there are two intake valves seats at the termination of the intake passage and both on the same side of the plane containing the cylinder bore axis and opening into the cylinder head surface and controlled by a respective intake valve.

9. An internal combustion engine as set forth in claim 8, wherein the intake valve seats are disposed in side-by-side relationship at spaced distances from the plane containing the cylinder bore axis and both are shrouded on their outer surfaces adjacent the cylinder bore.

10. An internal combustion engine as set forth in claim 9, wherein the fuel injector is disposed between the intake valve seats.

11. An internal combustion engine as set forth in claim 10, wherein the fuel injector extends generally parallel to and below the intake passages.

12. An internal combustion engine as set forth in claim 1, further including a flow control valve positioned in the intake passage for redirecting the flow through the intake passage toward one side of the intake valve scat when in one position and not substantially affecting the flow through said intake passage when in another position.

13. An internal combustion engine as set forth in claim 12, wherein the flow control valve in its one position directs the air flow toward the unshrouded portion of the intake valve seat.

14. An internal combustion engine as set forth in claim 13, further including a spark plug having a spark gap disposed substantially on the cylinder bore axis.

15. An internal combustion engine as set forth in claim 14, further including an exhaust passage extending from an exhaust valve seat disposed in the cylinder head surface on the opposite side of the plane containing the cylinder bore axis from the intake valve scat and exiting the cylinder block, cylinder head assembly through an outlet opening formed in the cylinder head portion.

16. An internal combustion engine as set forth in claim 15, wherein there are two intake valves seats at the termination of the intake passage and both on the same side of the plane containing the cylinder bore axis and opening into the cylinder head surface and controlled by a respective intake valve.

17. An internal combustion engine as set forth in claim 16, wherein the intake valve seats are disposed in side-by-side relationship at spaced distances from the plane containing the cylinder bore axis and both are shrouded on their outer surfaces adjacent the cylinder bore.

18. An internal combustion engine as set forth in claim 17, wherein the fuel injector is disposed between the intake valve seats.

19. An internal combustion engine as set forth in claim 18, wherein the fuel injector extends generally parallel to and below the intake passages.

20. An internal combustion engine as set forth in claim 1, further including control means for controlling the timing of injection of fuel from the fuel injector and wherein under low speed/low load conditions the injector begins its injection at a time when the piston is at the end of its compression stroke and under other running conditions the fuel injector begins its injection during the intake stroke.

21. An internal combustion engine as set forth in claim 1, wherein the shrouding is provided by recessing the portion of the intake valve seat engaged by the poppet type intake valve into a cavity formed in an area of the surface of the cylinder head portion closest to the cylinder bore and having the remaining portion of said intake valve seat engaged by said poppet type intake valve substantially flush with said surface of said cylinder head portion.

\* \* \* \* \*